US008264437B2

(12) United States Patent
Nitanda

(10) Patent No.: US 8,264,437 B2
(45) Date of Patent: Sep. 11, 2012

(54) DISPLAY FOR HIGH BRIGHTNESS CONDITIONS

(75) Inventor: Hiroyuki Nitanda, Morrisville, NC (US)

(73) Assignee: Sony Mobile Communications AB, Lund (SE)

( * ) Notice: Subject to any disclaimer, the term of this patent is extended or adjusted under 35 U.S.C. 154(b) by 410 days.

(21) Appl. No.: 12/201,141

(22) Filed: Aug. 29, 2008

(65) Prior Publication Data

US 2010/0053051 A1 Mar. 4, 2010

(51) Int. Cl.

*G09G 3/36* (2006.01)
*G09G 5/10* (2006.01)
*G06F 3/038* (2006.01)
*G09F 13/04* (2006.01)

(52) U.S. Cl. .......... 345/89; 345/102; 345/207; 345/690; 345/901; 362/97.2

(58) Field of Classification Search .................... 345/89, 345/102, 204–207, 690, 901; 362/97.1–97.3
See application file for complete search history.

(56) References Cited

U.S. PATENT DOCUMENTS 6,850,209 B2 * 2/2005 Mankins et al. ............... 345/1.3
7,348,991 B1 * 3/2008 Keating et al. ................ 345/589
7,714,831 B2 * 5/2010 Plut ............................... 345/102
2006/0244702 A1 * 11/2006 Yamazaki et al. .............. 345/89
2007/0222742 A1 * 9/2007 Kimura et al. ................ 345/102
2007/0273680 A1 * 11/2007 Yang et al. .................... 345/207
2008/0055519 A1 3/2008 Battersby et al.
2008/0106553 A1 * 5/2008 Lee et al. ...................... 345/590

FOREIGN PATENT DOCUMENTS

EP 1 724 751 A1 11/2006

OTHER PUBLICATIONS

International Search Report dated Jul. 27, 2009 issued in corresponding PCT application No. PCT/US2009/043911, 13 pages.
International Preliminary Report on Patentability dated Sep. 27, 2010 issued in corresponding PCT application No. PCT/US2009/043911, 9 pages.

* cited by examiner

*Primary Examiner* — Lun-Yi Lao
*Assistant Examiner* — Jarurat Suteerawongsa
(74) *Attorney, Agent, or Firm* — Snyder, Clark, Lesch & Chung, LLP

(57) ABSTRACT

A device including a housing and a display provided on a surface of the housing. The device also includes a light sensor provided on the surface of the housing, and a controller coupled to the display and the sensor. The controller is configured to change a display mode of the display from a first display mode to a monochromatic display mode when a light level of ambient light sensed by the light sensor exceeds a threshold value.

15 Claims, 5 Drawing Sheets

400

400

DISPLAY FOR HIGH BRIGHTNESS CONDITIONS

TECHNICAL FIELD

The present disclosure relates to devices having displays and, more particularly, to controlling the manner in which information is displayed on the devices.

BACKGROUND

Mobile communication devices, such as cellular phones and the like, have become increasingly prevalent. These devices provide the convenience of a handheld communication device with increased functionality. An expanding variety of additional features have become available, for example, short or multimedia messaging, multimedia playback, electronic mail, audio-video capturing, interactive gaming, data manipulation, web browsing, and the like. Other enhancements, such as, location-awareness features, e.g., global position system (GPS) tracking, enable mobile communication devices to monitor their position and present their location via a local display.

These devices can connect to a variety of information and media sources such as the Internet, enabling users to watch movies, read and write text messages and emails, as well as engage in phone calls, at times concurrently. The variety of available user application features requires a greater degree of user input for interactive functionality. However, as many such devices are used as mobile devices, the user inevitably encounters a vast number of different ambient light conditions, which can affect the user's ability to see items depicted on the display. For example, while typical displays can be easily viewed under low light conditions, it may become very difficult to see items displayed on such displays under high brightness light conditions. If the user is unable to see the items displayed on the display, then the user's ability to utilize the communication device is greatly hampered.

Therefore, the need exists for an improved display under not only low light conditions, but also bright light conditions.

DISCLOSURE

The above described needs are fulfilled, at least in part, by providing a device having a display and a controller configured to change a display mode of the display from color display to a monochromatic display mode when a light level of ambient light on the display exceeds a threshold value. For example, the housing, controller and display may be embodied in a mobile communication device.

A controller of the device is coupled to a display and light sensor that are provided on a surface of the housing. The controller is configured to change display operation from a first color display mode to a monochromatic display mode when a light level of ambient light sensed by the light sensor exceeds a threshold value. The device may contain a plurality of displays on different surfaces with corresponding light sensors in close proximity therewith. The display mode for each display thus may be independently controlled. Alternatively, a single light sensor may be utilized for control of the display mode for all displays.

A method of operation may provide a user of the device an option to select a monochromatic display feature. With such feature implemented, the light sensor can be activated in successive intervals, the particular mode of display dependent upon the sensed ambient light. The monochromatic display mode is operative when the sensed ambient light level exceeds a threshold value.

Additional advantages of the present disclosure will become readily apparent to those skilled in this art from the following detailed description, wherein preferred embodiments of the disclosure is shown and described, simply by way of illustration of the best mode contemplated. As will be realized, the disclosure is capable of other and different embodiments, and its several details are capable of modifications in various obvious respects. Accordingly, the drawings and description are to be regarded as illustrative in nature, and not as restrictive.

DETAILED DESCRIPTION

Figure 1A:
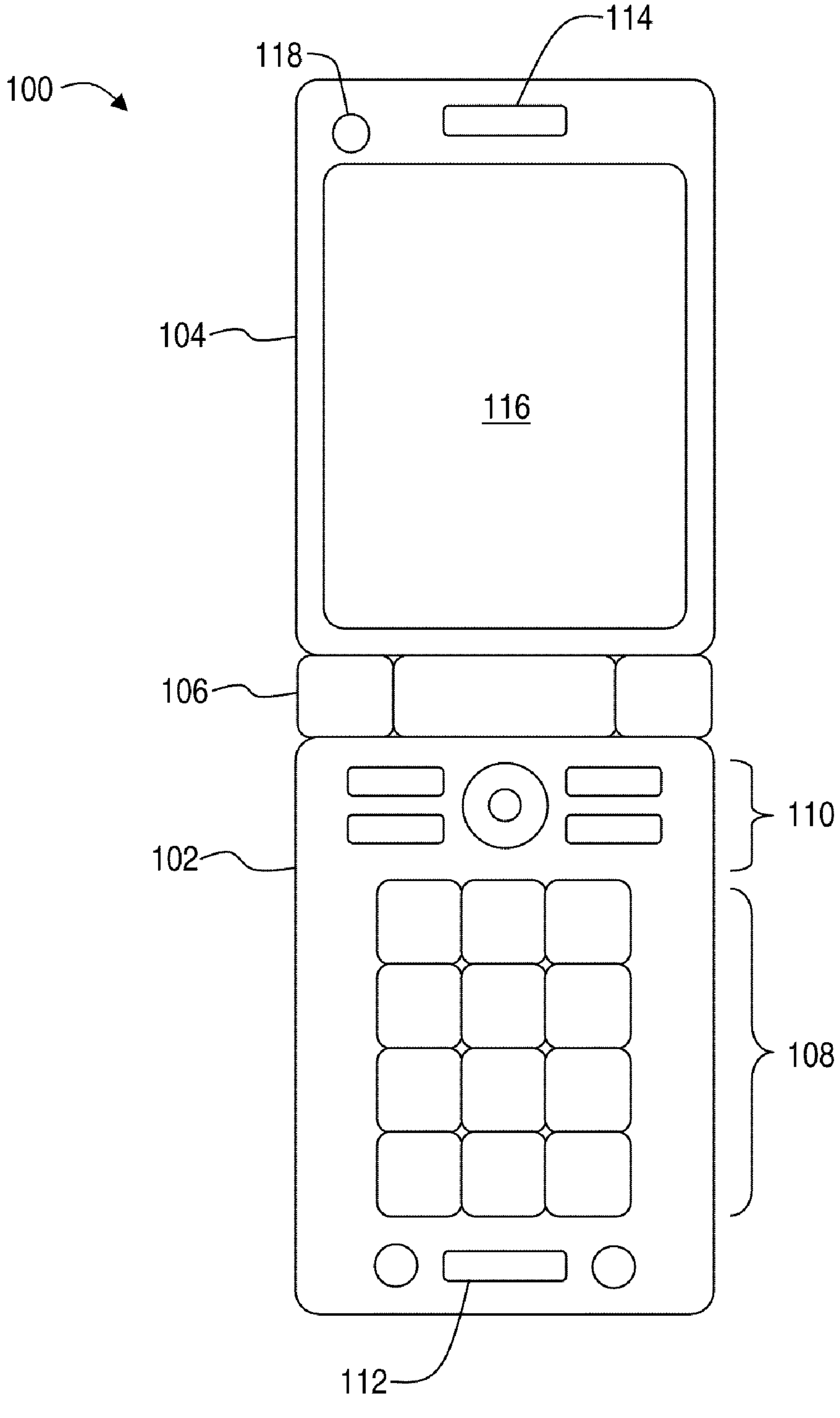
FIG. 1A is a front view of a mobile communication device that is configured to control displayed information thereon in response to ambient brightness conditions, with the communication device shown in an open configuration.

Embodiments of the present disclosure will be described hereinafter with reference to the accompanying drawings. In the following description, the constituent elements having substantially the same function and arrangement are denoted by the same reference numerals, and repetitive descriptions will be made only when necessary.

Figure 1B:
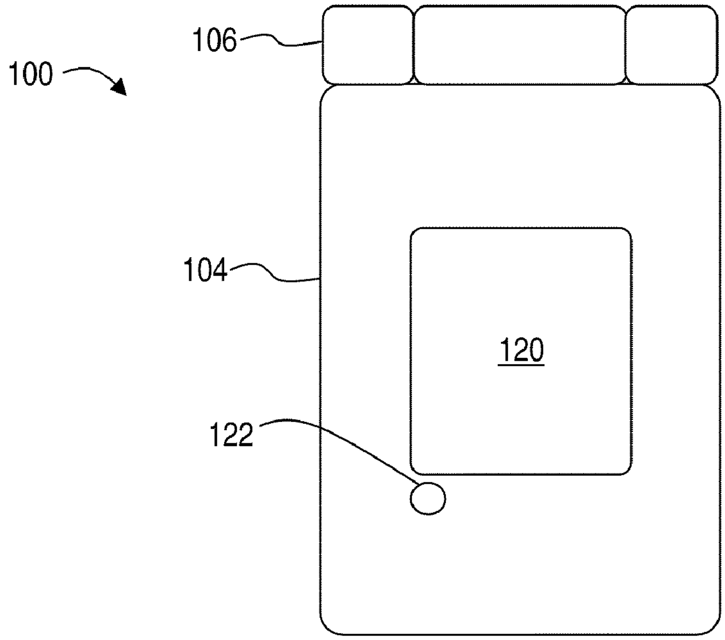
FIG. 1B is a front view of the communication device of FIG. 1A, with the communication device shown in a closed configuration.

FIG. 1A is a front view of a mobile communication device 100 that is configured to control displayed information thereon in response to ambient brightness conditions, with the communication device shown in an open configuration, and FIG. 1B is a front view of the communication device 100 of FIG. 1A, with the communication device shown in a closed configuration. While the embodiment depicted is configured as a cellular telephone, the device can be configured as any variety of devices (e.g., wireless or wired public switched telephone network device, a voice over internet protocol device, any variety of wireless communication devices such as a cellphone, personal digital assistant, pager, two-way radio transceiver, etc.).

The device 100 depicted in FIG. 1A includes a lower housing portion 102 and an upper housing portion 104, which is pivotally connected to the lower housing portion 102 by a joint portion 106. The lower housing portion 102 includes a keypad or keyboard 108, as well as a set of control buttons 10. The lower housing portion 102 also includes a microphone 112. The upper housing portion 104 includes a speaker 114 and a display 116. The upper housing portion 104 also includes a light sensor 118, which is provided on a same surface of the upper housing portion 104 as the display 116 and at a location adjacent to the display 116, and which is used in conjunction with the display in a manner as described below.

The display 116 can be configured as a touchscreen device that can be used to input various commands, as well as displaying information. The keyboard 108 and/or control buttons 110 can include any number and variety of user input devices, such as buttons used to enter numbers, letters, or other input commands.

As noted above, FIG. 1B is a front view of the communication device 100 of FIG. 1A, with the communication device shown in the closed configuration. As can be seen in FIG. 1B, an additional display 120 can be provided on an outer surface of the upper housing portion 104. The additional display 120 can be used, for example, to display the name and/or phone number of an incoming call, and/or to display the time, date, etc. The outer surface of the upper housing portion 104 also includes a light sensor 122, which is provided on a same surface of the upper housing portion 104 as the display 120 and at a location adjacent to the display 120, and which is used in conjunction with the display in a manner as described below.

Various devices and display configurations, such as swivel phones, slider phones, etc., can be provided with displays, light sensors and display control features disclosed as herein.

Figure 2:
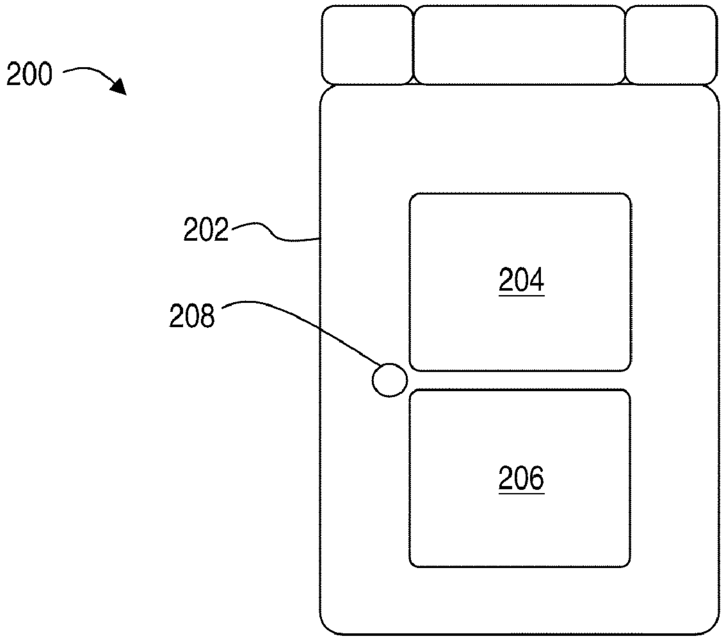
FIG. 2 is a front view of an another embodiment of a mobile communication device that is configured to control displayed information thereon in response to ambient brightness conditions, with the communication device shown in a closed configuration.

FIG. 2 shows a front view of an alternative embodiment of a communication device 200, with the communication device shown in the closed configuration. In this embodiment, an outer surface of the upper housing portion 202 is provided with two additional displays 204 and 206. The outer surface of the upper housing portion 202 also includes a light sensor 208, which is provided on a same surface of the upper housing portion 202 as the displays 204 and 206 and at a location adjacent to the displays 204 and 206, and which is used in conjunction with the displays in a manner as described below. Alternatively, each display 204 and 206 could be provided with its own separate light sensor.

Figure 3A:
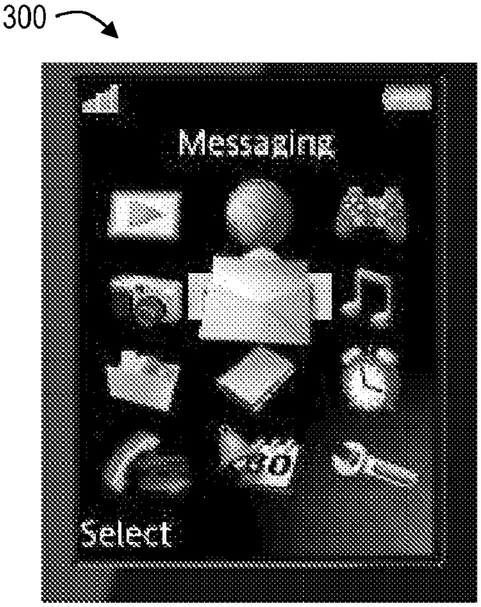
FIG. 3A is a simulation of a display of a mobile communication device with the display in a normal display mode and with normal or low ambient brightness conditions.

FIG. 3A is a simulation of a display 300 of a mobile communication device with the display in a normal display mode and under normal or low ambient brightness conditions. For example, the display 300 can be a liquid crystal display (LCD) with backlighting. Such displays typically show images, graphics, and text using a broad spectrum of colors in order to give the display, which acts as a user interface for the device, an aesthetically pleasing appearance and a depiction that the user can easily comprehend. Such display layouts are typically easily seen by users under normal ambient light conditions, such as in indoor settings with standard artificial lighting (e.g., using a 40 W light bulb, 60 W light bulb, etc.) or comparable outdoor ambient light conditions. Such displays are also typically easily seen by users under low ambient light conditions, and even in conditions where there is no ambient light. In such normal ambient light conditions or below, the backlighting of such an LCD display provides the user with sufficient contrast amongst the various features being displayed on the display to allow the user to clearly seen the displayed images. However, with such displays, a problem can arise when the display is subjected to high ambient light conditions (e.g., direct sunlight, bright reflected sunlight, high artificial light, etc.).

Figure 3B:
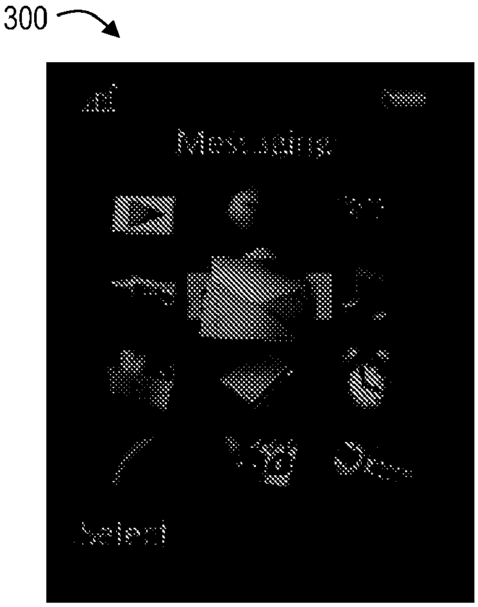
FIG. 3B is a simulation of the display of the mobile communication device of FIG. 3A with the display in the normal display mode and with high ambient brightness conditions.

Under high ambient light conditions, displays such as the LCD display depicted in FIG. 3A can become very difficult to view. FIG. 3B is a simulation of the display 300 of the mobile communication device of FIG. 3A with the display in the normal display mode and with high ambient brightness conditions. Under such conditions, the backlighting of the display no longer provides the user with sufficient contrast between the various images on the display, as is simulated in FIG. 3B. Without sufficient contrast amongst the images shown on the display, it will become difficult or impossible for the user to utilize the display interface to operate the various features of the communication device.

Figure 4A:
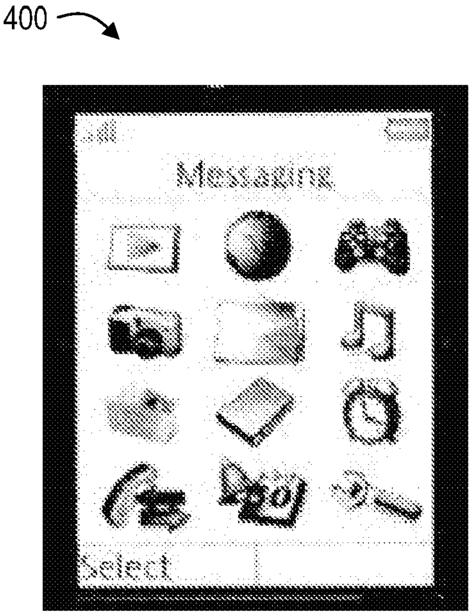
FIG. 4A is a simulation of a display of a mobile communication device with the display in a monochromatic display mode and with normal or low ambient brightness conditions.

FIG. 4A is a simulation of a display 400 of a mobile communication device with the display in a monochromatic display mode and under normal or low ambient brightness conditions. For example, the display 400 can be the same LCD with backlighting shown in FIG. 3A. However, in the monochromatic display mode shown in FIG. 4A, the images on the display have been changed from color images to black-and-white images. Alternatively, the images in the monochromatic display mode could be in grayscale, or in other highly-contrasted colors. Preferably, however, a simple black-and-white image is used in the monochromatic display mode, in order to provide the greatest contrast. Furthermore, preferably, dark images (e.g., text, icons, etc.) are provided on a white background. The images displayed on the display could be a converted version (e.g., by assigning certain pixel colors/shades to black and other pixel colors/shades to white) of the original image (e.g., a converted black-and-white image of a color webpage, color menu, or color photograph, etc.) or the images could be a predetermined black-and-white version of the original image (e.g., the communication device can store and utilize a color version of a menu when in normal display mode and a black-and-white version of the same menu when in monochromatic display mode).

Figure 4B:
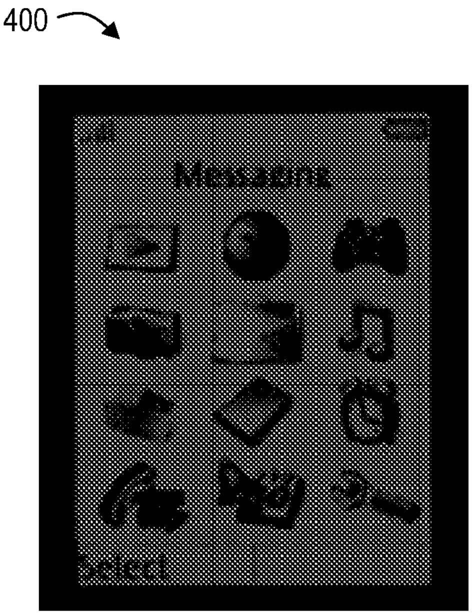
FIG. 4B is a simulation of the display of the mobile communication device of FIG. 4A with the display in the monochromatic display mode and with high ambient brightness conditions.

The images used in the monochromatic display mode provide a high contrast between the various features and images shown on the display. Thus, even under high ambient light conditions, displays using the monochromatic display mode can be seen by the user. FIG. 4B is a simulation of the display 400 of the mobile communication device of FIG. 4A with the display in the monochromatic display mode and with high ambient brightness conditions. Under such conditions, the backlighting of the display when used in conjunction with the monochromatic display will provide the user with sufficient contrast between the various images on the display, as is simulated in FIG. 4B. Thus, the display will provide the user with the ability to utilize the display interface to operate the various features of the communication device.

Accordingly, the light sensors as shown in FIGS. 1A, 1B, and 2, when used in conjunction with their respective displays, can be used to control the displays such that the displays use a normal display mode under normal and low ambient light conditions as shown in FIG. 3A, and use a monochromatic display mode under high ambient light conditions as shown in FIG. 4B. Therefore, the displays can utilize an aesthetically pleasing normal color display mode when ambient light conditions permit (i.e., under normal or low ambient light conditions), and then switch to a more effective monochromatic display mode when ambient light conditions would otherwise prevent the user from seeing the images on the display (i.e., under high ambient light conditions).

Figure 5:
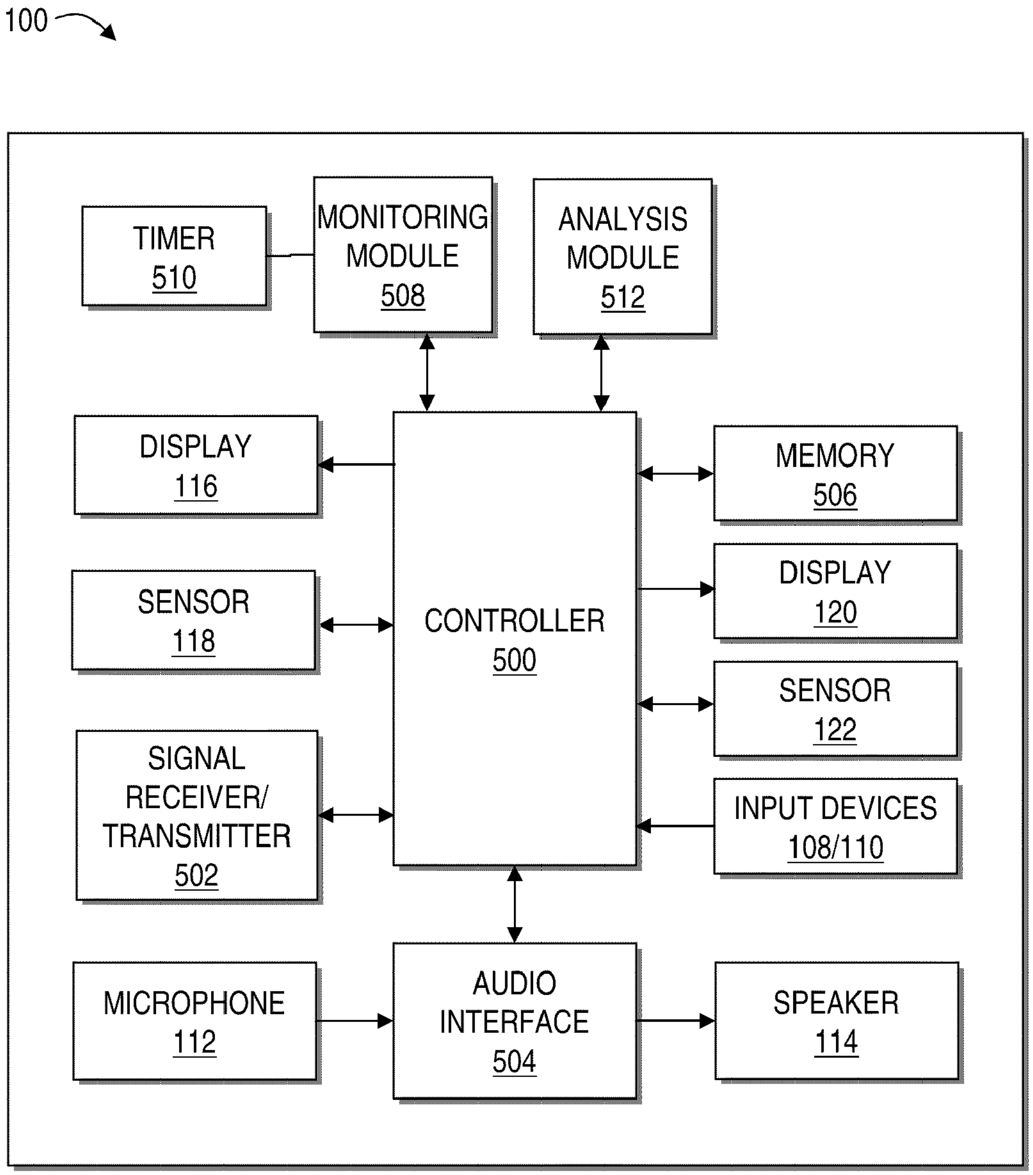
FIG. 5 is a block diagram of components of the communication device depicted in FIG. 1A.

FIG. 5 is a block diagram of components of the communication device depicted in FIG. 1A. A controller (e.g., processor) 500 is coupled to input devices (e.g., keypad 108, control buttons 110, touchscreen, or other user input device(s)), the display 116, the light sensor 118, the display 120, and the light sensor 122. The controller 500 is also connected to a signal receiver/transmitter 502 that receives communication signals from and sends communication signals to other telephones or communication devices directly or via a wireless or wired communication network (e.g., cellular communication network, voice over internet protocol network, public switched telephone network, short or multimedia messaging system networks, radio transmission/receiver system, etc.), and the controller 500 is also connected to a memory 506 in any well-known telephone configuration, for example. The controller 500 is connected to, and receives input from a user using the microphone 112 and provides output to the user using the speaker 114 via an audio interface 504.

The controller 500 is additionally coupled to a monitoring module 508 that is connected to a timer 510, and to an analysis module 512. Thus, for example, when the monochromatic display mode feature is active, the monitoring module 508 and timer 510 can be utilized to gather ambient light data from one or more of the sensors 118 and 122, and that data can then be used by the analysis module 512 to determine whether one or more of the displays 116 and 120 should be in the normal display mode or in the monochromatic display mode. Based on the determination made by the analysis module 512, the controller 500 can then operate the respective display(s) in the appropriate display mode. When the monochromatic display mode feature is active, the timer 510 can be used to control the interval of time at which data will be gathered and decisions will be made regarding the appropriate display mode to be used.

If desired, various aspects of the monochromatic display mode feature can be defined by the user, and such settings stored in the memory 506. For example, the user can define whether or not the monochromatic display mode feature is active (i.e., performing sensing of ambient light for one or more of the displays, and adjusting the display mode accordingly) or inactive (i.e., shut off), a threshold ambient light level at which the monochromatic display mode is used, a particular color scheme used during the monochromatic display mode (e.g., simple black-and-white, other two-color contrast, grayscale, etc.), interval at which sensing occurs, etc.

Figure 6:
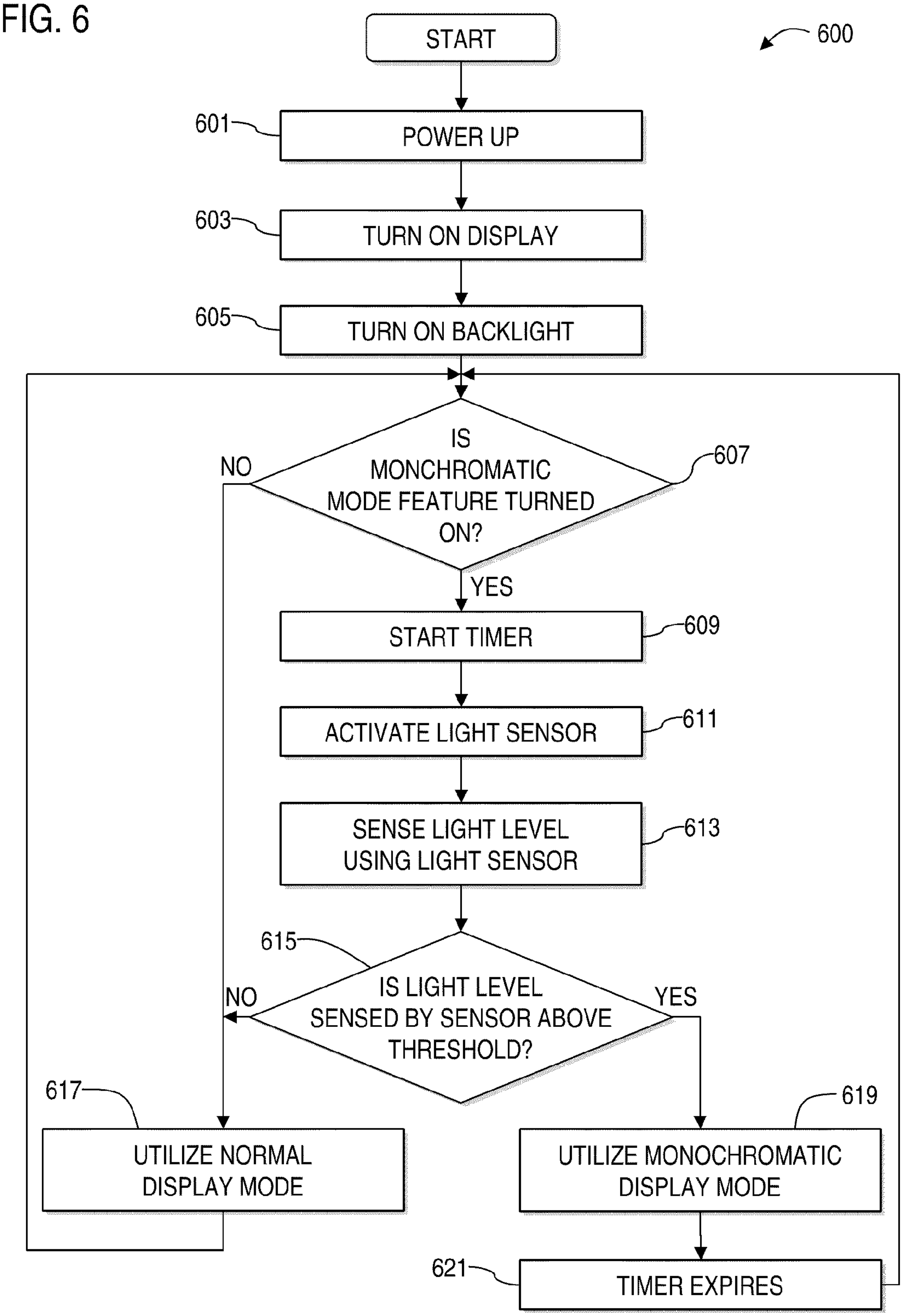
FIG. 6 is a flowchart of a process of controlling display of information on a display in response to ambient brightness conditions.

FIG. 6 is a flowchart of a process 600 of controlling display of information on a display in response to ambient brightness conditions. The process 600 begins with the powering up of the device in step 601. In steps 603 and 605, the display and the backlight are turned on. In step 607, a determination is made regarding whether a monochromatic display mode feature is turned on. If the monochromatic display mode feature is not turned on, then the process 600 proceeds to step 617 and the normal display mode is utilized. The process then loops back to step 607, and step 607 is repeated at a predetermined interval.

If, however, a determination is made in step 607 that the monochromatic display mode feature is turned on, then the process 600 proceeds to step 609 and a timer (e.g., timer 510) is started. In step 611, one or more light sensors (e.g., light sensors 118, 122, 208) are activated, and the light sensor(s) sense the light level of the ambient light in step 613. In step 615, a determination is made (e.g., by analysis module 512) regarding whether the light level sensed by the light sensor is above a threshold value. Such a determination is made for each active light sensor. If the light level sensed is not above the threshold, then the corresponding display utilizes the normal display mode, in step 617. However, if the light level sensed by one or more of the light sensors is above the threshold value, then the corresponding display(s) utilizes the monochromatic display mode, in step 619. Once the timer expires in step 621, the process loops back to step 607. Thus, the process provides the device with a dynamic display mode feature that can regularly sense whether the display mode needs adjustment based on ambient light conditions, and make such adjustments as needed.

In an alternative embodiment, the switching from normal display mode to the monochromatic display mode can be manually performed by the user.

In a further alternative embodiment, the monochromatic display mode is used to change certain display features to black-and-white when the threshold value is exceeded, and to leave other display features in normal display mode even if the threshold value is exceeded. For example, in such an embodiment, display features that are generated for and stored within the device (e.g., system menus, text messaging platform graphics, music player menus, etc.) are changed to a monochromatic version thereof; however, other images such as pictures, movies, downloaded webpages, etc. are not changed to a monochromatic version even if the threshold value is exceeded. For example, the distinction between whether a monochromatic version is used or not can be dependent upon whether or not a prestored monochromatic version is present in the memory of the device. Thus, the device can be provided with and store therein both a normal version and a monochromatic version of certain application interface images (e.g., menus and other application platforms) that can be selectively utilized in the monochromatic display mode; however, other displayed features for which no such corresponding monochromatic version is stored in the memory will simply be displayed in the normal version even if the threshold value is exceeded.

It should be noted that the exemplary embodiments depicted and described herein set forth the preferred embodiments of the present disclosure, and are not meant to limit the scope of the claims hereto in any way. Numerous modifications and variations of the present disclosure are possible in light of the above teachings. It is therefore to be understood that, within the scope of the appended claims, the disclosed concepts may be practiced otherwise than as specifically described herein.

What is claimed is:

1. A portable handheld communication device comprising:
- a housing;
- a display provided on a surface of the housing;
- a light sensor, provided on the surface of the housing, to sense ambient light;
- a memory to store:
  - multiple versions of a first particular image, of a plurality of a first type of images, wherein the multiple versions of the particular image vary in contrast, and
  - a plurality of images, of a second type, for which no corresponding monochromatic versions are stored in the memory; and
- a controller coupled to the display and the light sensor,
- wherein, when a light level of the ambient light exceeds a threshold value, the controller is configured to:
  - assign first pixel colors and/or shades to black, and second pixel colors and/or shades to white,
  - convert, based on the assignment, a second particular image, of the second type of images, to a monochromatic image, change a display mode of the display, from a first display mode to a monochromatic display mode, for presenting at least one of the first particular image or the converted second particular image on a background present on the display, and retain, in the first display mode, the display mode for presenting one or more images of the second type of images.

2. The portable handheld communication device according to claim 1, wherein the first display mode is configured to display color images, and the monochromatic display mode is configured to display color images that have been converted into gray scale images corresponding to the second particular image.

3. The portable handheld communication device according to claim 1, wherein the monochromatic display mode is configured to display text, icons, and other images, generated for the portable handheld communication device and corresponding to the first particular image, in black on a white background.

4. The portable handheld communication device according to claim 1, wherein the controller is further configured to select a particular version, of the plurality of versions of the first particular image, based on the contrast associated with the particular version.

5. The portable handheld communication device according to claim 1, wherein the light sensor is configured to sense the light level at successive intervals.

6. A mobile handheld communications device comprising:

a first display;

a first light sensor to sense a first ambient light level associated with the first display;

a housing having a first surface upon which the first display is provided;

a second display provided on a second surface of the housing;

a second light sensor to sense a second ambient light level associated with the second display; and a controller coupled to the first display, the second display, the first light sensor, and the second light sensor;

wherein the controller is configured to independently and concurrently set:

a color display mode for the first display in response to:

the first ambient light level being lower than a threshold value, or the first ambient light level exceeding the threshold value and a determination that a first particular image, to be displayed via the first display, is stored in a memory of the mobile handheld communications device, in a color version and not in a monochrome version, and a monochromatic display mode for the second display in response to:

the second ambient light level exceeding the threshold value, and:

a determination that a second particular image, to be displayed on a background present on the second display, is stored in the memory of the mobile handheld communications device, in a color version and in a monochrome version, and if not, a determination that the first particular image, to be displayed on the background present on the second display, is to be converted to a monochromatic version based on an assignment of first pixel colors and/or shades to black, and an assignment of second pixel colors and/or shades to white.

7. The mobile handheld communications device according to claim 6, further comprising:

a third display provided on the second surface of the housing;

wherein the controller is responsive to the second ambient light level to selectively set display operation for the third display in one of the color and monochromatic display modes.

8. The mobile handheld communications device according to claim 6, wherein the monochromatic display mode is configured to display color images, corresponding to the first particular image, that have been converted into gray scale.

9. The mobile handheld communications device according to claim 6, wherein the monochromatic display mode is configured to display text, icons, and other images, generated for the mobile handheld communications device and corresponding to the second particular image, in black on a white background.

10. The mobile handheld communications device according to claim 6, further comprising:

a memory to store, for the second particular image, a first set of display data for a color image and a corresponding second set of display data for a monochromatic image, wherein the controller is further configured to select the second set of display data for displaying in the monochromatic display mode.

11. The mobile handheld communications device according to claim 6, further comprising:

a timer to provide a plurality of intervals, wherein the first light sensor is configured to sense the first ambient light level at successive intervals of the plurality of intervals.

12. A method comprising:

storing a plurality of images, in a memory of a communication device, wherein some of the stored images include one or more monochromatic image versions corresponding to a color image version, and some of the stored images include a color image version and no corresponding monochromatic image version;

sensing a level of ambient light associated with a display of the mobile communication device;

comparing the ambient light level with a particular amount;

displaying a color image version and not a monochromatic image version of a first image, of the stored images, via the display, when the ambient light level is less than the particular amount, determining, when the ambient light level exceeds the particular amount, whether a second image, of the stored images, includes a monochromatic image version;

displaying, when the second image includes a monochromatic image version, the monochromatic image version of the second image on a background via the display;

displaying, when the second image does not include a monochromatic image version, a color image version of the second image on the background via the display;

determining, when the ambient light level exceeds the particular amount, that a third image, of the stored images, does not include a monochromatic image version;

converting the third image into a monochromatic image version; and displaying the monochromatic image version of the third image on the background via the display.

13. The method according to claim 12, wherein the color image version of the first image is downloaded to the mobile communication device.

14. The method of claim 13, further comprising:

displaying the monochromatic image version of the first image in place of the color image version of the first image upon further sensing that the ambient light level exceeds the particular amount.

15. The method according to claim 12, wherein displaying the monochromatic image version of the second image comprises:

setting a monochromatic display mode, from a plurality of monochromatic display modes of varying contrast, providing a greatest amount of contrast.

* * * * *